Figure 1:
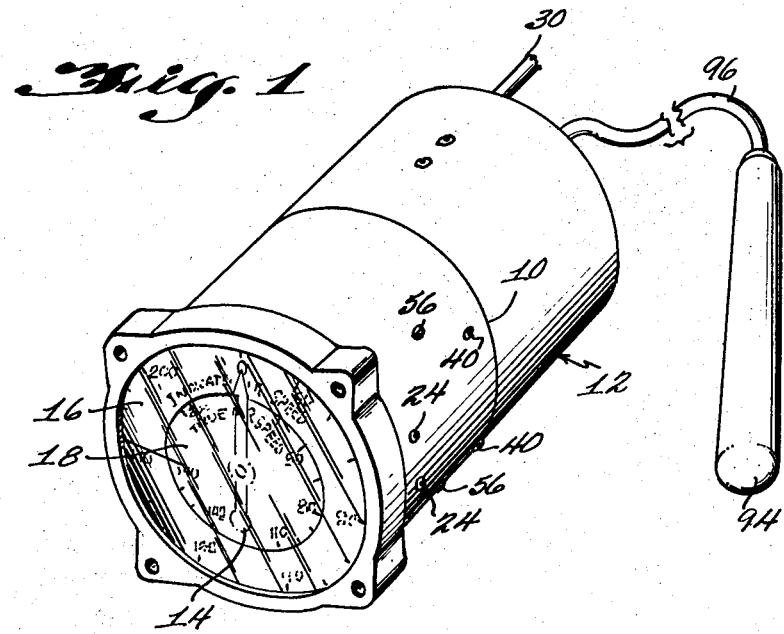

March 31, 1964 R. H. GIBBS 3,126,737
AIRSPEED INDICATOR

Filed Dec. 29, 1961 2 Sheets-Sheet 1

INVENTOR.
RICHARD H. GIBBS
BY
Cushman, Darby & Cushman
ATTORNEYS

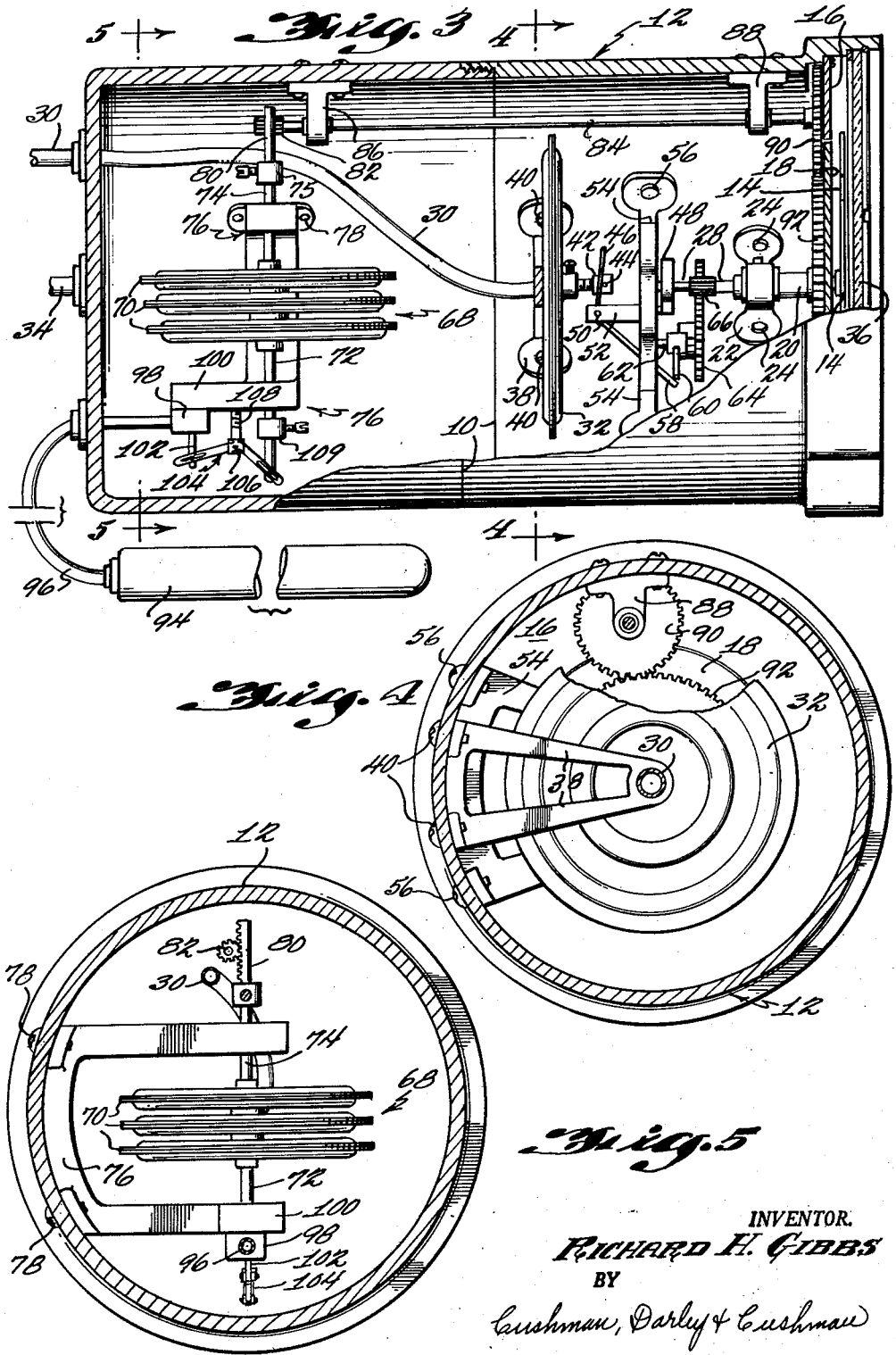

United States Patent Office 3,126,737
Patented Mar. 31, 1964

3,126,737
AIRSPEED INDICATOR
Richard H. Gibbs, P.O. Box 470, Somerset, Pa.
Filed Dec. 29, 1961, Ser. No. 163,165
4 Claims. (Cl. 73—181)

This invention relates to an air speed indicator, and more particularly, to an improved indicator which automatically and simultaneously measures the indicated air speed and the true air speed of an aircraft.

As is well known, the indicated air speed is a necessary measurement for determining the stalling speed of an aircraft. In more particular terms, the indicated air speed is the measurement of relative motion between the aircraft and the air and it is this relative movement which gives buoyancy to the aircraft.

Conventional air speed indicators serve to measure this so-called indicated air speed so that the pilot may determine at any particular time whether the airplane is approaching stalling conditions or is moving with sufficient speed to maintain its flight.

While the measurement of the indicated air speed is indeed important, it is necessary for purposes of navigation to measure another form of air speed, commonly referred to as "true" air speed.

True air speed can be defined as indicated air speed corrected for the instant altitude with reference to a predetermined altitude, which is generally taken as at sea level. In other words, true air speed is equal to the indicated air speed at sea level, but not generally at any altitude greater than sea level. Temperature and pressure conditions at sea level are generally considered to be 760 mm. of mercury and 15° C., which conditions form the basis for standardizing true air speed calculations. As the pressure and temperature vary with altitude, the true air speed will be caused to differ from the indicated air speed, and this difference must be compensated for in order to obtain a reading of true air speed.

In the past, various methods have been employed for determining the true air speed from the indicated air speed. Common amongst these is the so-called E-6B Computer. It is essentially a circular slide rule, which of its nature required a pilot, especially of a small plane, to concentrate on the computer rather than upon flying the plane. Its use is fairly complicated, and of course it will not provide an instantaneous reading of true air speed and indicated air speed. Such computers are of rather complicated design and accordingly expensive, subject to failure, and impractical for use in a light aircraft.

The prior art also includes mechanisms for automatically indicating true air speed and indicated air speed simultaneously. For example, reference may be made to the Darbujan Patent 2,927,460, issued March 8, 1960. In the apparatus referred to in that patent, a single dial is employed with two pointers one of which indicates the indicated air speed and the other the true air speed. To cause the true speed pointer to operate properly, a quite complicated mechanism is operated off of the shaft which is coupled between the indicated air speed pointer and a diaphragm whose expansion and contraction movements correspond to the differences between total or ram and static air pressure variations.

The instant invention eliminates the necessity for the complicated true air speed mechanism of the type described in the Darbujan patent. When the indicated air speed mechanism and true air speed mechanism are combined in accordance with this invention, there is only a single pointer which cooperates with two dials one of which has scale markings for indicated air speed and the other of which has scale markings for true air speed. The true air speed dial is rotatable relative to the indicated air speed dial, and the mechanism for effecting this rotation is quite simple compared to the compensating mechanism in the Darbujan patent. In addition, this invention eliminates the possibility of confusion between two different pointers as to which marks true air speed and which marks indicated air speed. Instead of the two pointers, this invention has two dials, one of which is preferably smaller than the other so that there is never any question as to whether a reading on a dial indicates true or indicated air speed.

It is accordingly an object of this invention to provide an improved air speed indicator using relatively uncomplicated mechanism for effecting an indication of true air speed.

Another object of this invention, in conjunction with the foregoing object, is the elimination of possible confusion of indications of true and indicated air speeds.

Another object of this invention in conjunction with the foregoing objects is the provision of a pair of concentric dials for respectively indicating true air speed and indicated air speed, one of said dials being rotatable relative to the other and also to a single pointer for both dials.

Figure 2:
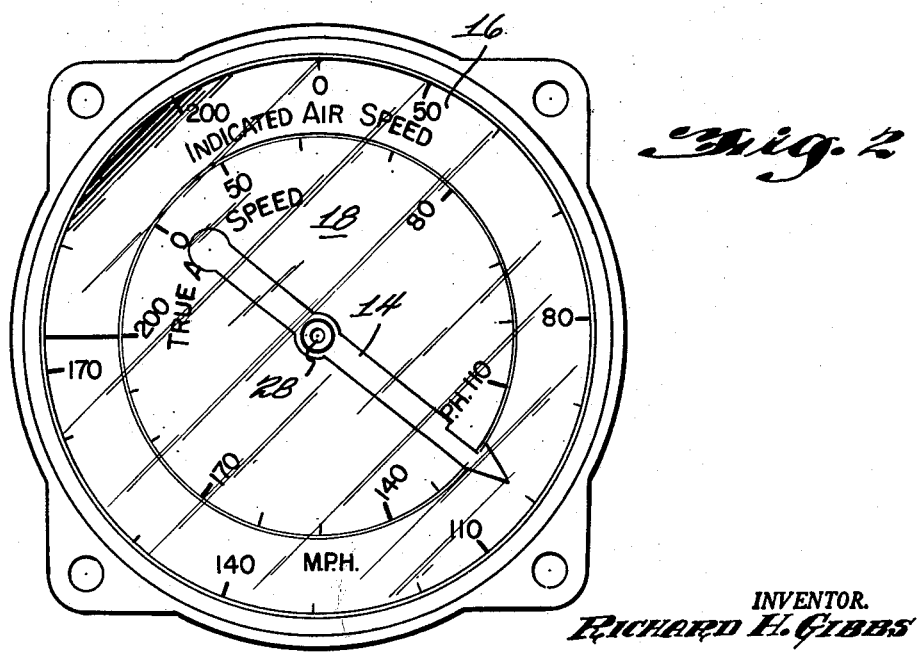

Other objects of this invention will become more apparent from the following detailed description of apparatus embodying the invention and appended claims, when considered in conjunction with the drawings, in which:

FIGURE 1 is a perspective view of an air speed indicator in accordance with this invention, FIGURE 2 is a face view thereof with the true air speed dial rotated relative to the indicated air speed dial, FIGURE 3 is a longitudinal cross section of the indicator of FIGURE 1, FIGURE 4 is a transverse cross section taken substantially along the lines 4—4 of FIGURE 3, FIGURE 5 is another transverse cross section of the FIGURE 3 apparatus, taken substantially along the lines 5—5 thereof.

A true air speed indicator, in accordance with this invention, may be added onto a conventional indicated air speed indicator as may be gathered by reference to FIGURES 1 and 4 wherein line 10 indicates the juncture of the front and rear parts of the overall casing 12. On the other hand, the casing for the front and rear parts of the whole air speed indicator may be one integral unit. As previously indicated, a single pointer 14 is employed with two separate scales or dials 16 and 18. Corresponding scale markings on both dials 16 and 18 are separated by the same angular distance, but the indicated air speed dial 16 is stationarily secured to casing 12, while the inner true air speed dial 18 is fixedly mounted on a shaft 20 which is rotatably mounted in a bracket 22 that is secured to the interior of the casing as by screws 24.

The outer or indicated air speed dial 16 preferably contains a central aperture in which the inner or true air speed dial 18 is disposed, so that at least the faces of the dials are co-planar. Pointer 14 is fixedly secured to shaft 28 which is mounted inside shaft 20 about an axis for rotation concentric with both of the dials 16 and 18.

To effect movement of the pointer relative to the outer dial 16 so as to give an indicated air speed reading, any conventional mechanism is coupled to the pointer shaft 28 to convey rotational movement thereto in conformity between the instantly existing difference between the total (or ram) and static pressures such as are commonly available from a Pitot-tube (not shown). In the particular mechanism illustrated, ram air pressure is transmitted from the Pitot-tube by a conduit 30 through casing 12 to the interior of a diaphragm 32 the exterior of which is subjected to static air pressure conveyed to the interior of casing 12 by conduit 34 from the Pitot-tube. As is conventional for air speed indicators, casing 12 is airtight and has a front viewing face including glass 36 which is sealingly secured to the casing.

Diaphragm 32 may be mounted within the casing in any desired manner, for example as by a bracket 38 the outer ends of which are secured to the inside of the casing as by screws 40 (FIGURE 4). When the difference between the measured ram and static air pressures changes, the right side (FIGURE 3) of diaphragm 32 accordingly moves rightwardly or leftwardly. This moves the threadingly adjustable screw member 42, and the transversely extending pin 44 carried by the head thereof in the same direction, with the pin 44 then pulling another pin or lever 46 leftwardly, or allowing it to move rightwardly under the action of a spring 48 in the manner now explained. Pin 46 protrudes radially from a shaft 50 which is rotatably mounted at opposite ends in arms 52 that are secured in a given position to bracket 54. This bracket rotatably carries the inner end of pointer shaft 28 and extends radially therefrom with its end arms being secured to the inside of the casing by screws 56. Extending radially from shaft 50, but at an angle to pin 46 and laterally spaced therefrom, is another pin or lever 58. The forward end of pin 58 cooperates with pin or lever 60 which extends radially from a shaft 62 on which a segment gear 64 is also securely mounted for movement therewith. This gear cooperates with pinion gear 66 to cause rotation of the pointer shaft 28. Spring 48 is secured at its outer end to bracket 54, and at its inner end to shaft 28, to cause rotation of the pointer 14 clockwise in FIGURE 2 when diaphragm 32 of FIGURE 3 expands to allow pin 46 to rotate forwardly. Of course, when diaphragm 32 contacts, pin 46 is pulled backwards against the action of spring 48. As a consequence of the expansion and contraction movements of diaphragm 32, and the intervening linkages, pointer shaft 28 rotates relative to the stationary dial 16 and points to the instant scale marking thereon which corresponds to the indicated air speed.

As previously indicated, the mechanism coupled between diaphragm 32 and pointer shaft 28 may be of the type illustrated and above described, or it may be of any other conventional type.

Since the true air speed is equal to the indicated air speed only when the altitude of the indicator as a whole is at a predetermined point, such as sea level, the indicated air speed above that point does not give an accurate indication of true air speed. In accordance with this invention, inner dial 18 is employed with the same pointer 14 that reads the indicated air speed, to indicate the true air speed. This is accomplished by rotating dial 18 relative to dial 16, without at the same time causing pointer 14 to rotate due to dial 18 rotating. This compensates for the instant elevated altitude where the ambient temperature and static air pressure conditions are different than the respective conditions at the predetermined standard altitude point. Means for compensating or correcting for this difference includes second diaphragm means such as a standard aneroid 68 comprised of, for example, three separated, serially connected, diaphragms 70. Since the interior of casing 12 is subjected to static air pressure via conduit 34, aneroid 68 is also subjected to that pressure. This causes the aneroid to expand or contract with changes in static air pressure. To understand the operation of the aneroid, relative to dial 18, for the moment consider the lower side of the aneroid as connected to shaft 72 to be fixed in position (though such is not actually the case as will be apparent hereinafter). Then, as the static air pressure increases, the aneroid contracts causing the shaft 74 which is connected to the upper side of the aneroid, to move downwardly. Adjustable stop 75 on shaft 74 limits the degree of possible downward movement. Shafts 72 and 74 are slideably mounted in apertures contained in the laterally extending arms of brackets 76 (FIGURES 3 and 5) which is secured to the interior of the casing by screws 78. On the upper end of shaft 74 is ratchet 80 that cooperates with pinion gear 82. With shaft 74 and ratchet 80 moving downward, pinion 82 rotates counterclockwise when viewed from the indicator face end of the casing. This pinion is securingly fixed to shaft 84 which is rotatably mounted in brackets 86 and 88 that are secured to the casing. At the forward end of shaft 84 is fixedly secured a gear 90 which cooperates with gear 92. This latter gear is fixedly mounted on shaft 20 or to the true air speed dial 18 to cause rotation thereof in a clockwise direction in keeping with the example.

At the same time, the true air speed dial 18 must be rotated in the appropriate direction to compensate for the ambient temperature. To effect this, there is disposed exteriorally of casing 12 a temperature detecting or sensing bulb 94 (FIGURE 3) which coupled by a capillary line 96 through casing 12 to a Bourdon tube 98 which is secured to an arm 100 of bracket 76. By means of the Bourdon tube, changes in temperature are translated into vertical movement of arm member 102 which depends from the Bourdon tube, and this up and down motion is translated to rod 72 via a bell crank 104 which is pivoted about a fulcrum 106 adjustable in height by virtue of the threading of its stud 108 into arm 100. Each of the arms of bell crank 104 has a longitudinal aperture in which ride respective pins secured in the lower ends of rods 72 and 102. Therefore, for a change in temperature which causes rod 102 to move downward, rod 72 moves upward through its aperture in bracket 76 (the maximum upward movement being limited by adjustable stop 109) and this causes aneroid 68 as a whole to bodily move upward, pushing its upper rod 74 and ratchet 80 upward. In turn, this rotates shaft 84 and gear 90 clockwise (viewing it from the face end of the casing) and consequently gear 92 counterclockwise. Accordingly, under these circumstances, the true air speed dial 18 rotates counterclockwise to correct for ambient temperature. With both the static air pressure and temperature correcting or compensating mechanisms operating to effect rotation accordingly of shaft 84 for each change in either static air pressure or temperature, the true air speed dial 18 may be for the instant set of conditions rotated as shown in FIGURE 2 so that the pointer indicates a true air speed of 120 m.p.h. simultaneously with the indication of an indicated air speed of 100 m.p.h.

Thus, there has been described an air speed indicator which accomplishes all of the objects and has the advantages herein mentioned. It is to be understood that other objects and advantages of this invention may become apparent to those of ordinary skill in the art upon reading of the foregoing specification and appended claims in conjunction with the drawings, so limitation thereto, or to the particular structure disclosed, is not intended, the scope of the following claims being the measure of this invention.

What is claimed is:

1. An air speed indicator comprising an air-tight casing having a front viewing face, a first circular dial with indicated air speed markings thereon and disposed securely to said casing behind said face, said dial having an aperture substantially concentric with the periphery of said dial, a second dial disposed in said aperture and having scale markings for indicating true air speed, a pointer mounted for movement about an axis co-axial with each of said dials for indicating an instantly aligned set of scale markings on said dials respectively, diaphragm means, means for subjecting the diaphragm means internally to ram air pressure and externally to static air pressure, means coupled between said diaphragm and pointer for causing the pointer to move adjacent the scale markings on said indicated air speed dial in conformity with the difference between said static and ram pressures as effected by said diaphragm means to give an indicated air speed reading, said true air speed dial being positioned to have its corresponding scale markings aligned with those of the indicated air speed dial when said indicator is disposed to the temperature and pressure conditions existing substantially at sea level, and means for rotating said true air speed dial in conformance with the instant static air pressure and external temperature for any altitude of said casing above sea level to compensate for any difference between the respective static pressures and temperatures in the instant altitude of said casing relative to sea level, said compensating means including second diaphragm means evacuated and disposed to be externally subjected to static air pressure, turning means operatively connected between said true air speed dial and one side of said second diaphragm means, means external to said causing for measuring the ambient temperature, and means coupled between said temperature measuring means and the other end of said second diaphragm means for translating the amount of a measured temperature change into a rectilinear movement for bodily moving said second diaphragm means and said turning means accordingly and in conjunction with any effect on said second diaphragm means by said static air pressure.

2. Apparatus as in claim 1 and further comprising gear means concentrically mounted on said second dial, shaft means mounted for rotation, first pinion means fixed to an end of said shaft means for engagement with said gear means; second pinion means fixed to the other end of said shaft, and rack means connected to said second diaphragm means for engaging said second pinion means whereby movement of said second diaphragm means serves to rotate said second dial about its axis.

3. Apparatus as in claim 1 wherein said temperature change translating means includes a Bourdon tube coupled to the output of said temperature measuring means.

4. Apparatus as in claim 3 wherein said translating means further includes means coupled to said Bourdon tube for determining the amount of said rectilinear movement per amount of temperature change.

References Cited in the file of this patent
UNITED STATES PATENTS

| | | |
|---|---|---|
| 1,866,660 | Luckey et al. | July 12, 1932 |
| 2,081,950 | Nesbitt | June 1, 1937 |
| 2,167,412 | Baesecke | July 25, 1939 |
| 2,347,134 | Sidwell | Apr. 18, 1944 |
| 2,507,367 | Carbonara et al. | May 9, 1950 |
| 2,706,407 | Hosford | Apr. 19, 1955 |
| 2,927,460 | Darbujan | Mar. 8, 1960 |